(12) United States Patent
Kim

(10) Patent No.: US 6,862,432 B1
(45) Date of Patent: Mar. 1, 2005

(54) ANTENNA IMPEDANCE MATCHING DEVICE AND METHOD FOR A PORTABLE RADIO TELEPHONE

(75) Inventor: Hong Joo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 431 days.

(21) Appl. No.: 09/627,320

(22) Filed: Jul. 27, 2000

(30) Foreign Application Priority Data

Jul. 27, 1999 (KR) ........................................ 1999-30587

(51) Int. Cl.[7] .............................. H04B 1/46; H04B 1/18
(52) U.S. Cl. ........................ 455/80; 455/83; 455/193.1; 343/860
(58) Field of Search .............................. 455/80, 82, 83, 455/90, 78, 289, 575, 575.3, 575.7, 193.1, 193.2, 193.3; 343/860, 861, 862, 863, 864

(56) References Cited

U.S. PATENT DOCUMENTS

| | | | |
|---|---|---|---|
| 5,335,368 A | | 8/1994 | Tamura |
| 5,754,141 A | * | 5/1998 | Thompson et al. ......... 343/702 |
| 6,297,778 B1 | * | 10/2001 | Phillips et al. .............. 343/702 |
| 6,590,538 B1 | * | 7/2003 | Koyanagi et al. ........... 343/702 |
| 6,611,691 B1 | * | 8/2003 | Zhou et al. .................. 343/709 |

* cited by examiner

Primary Examiner—Nay Maung
Assistant Examiner—Edan Orgad
(74) Attorney, Agent, or Firm—McKenna Long & Aldridge LLP

(57) ABSTRACT

A device for matching an antenna impedance in a portable radio telephone having transmission and receiving circuits, a foldable casing enclosing the radio, the foldable casing movable between an unfolded position and a folded position, an antenna movable between an extracted position from the foldable casing and a retracted position into the foldable casing includes means for sensing whether the foldable casing is in the unfolded position and for sensing whether the antenna is in the extracted position, and for providing a sensing signal in response thereto, and means for matching an impedance of the antenna and an impedance of the radio in response to the sensing signal, thereby making an optimal matching of impedances between the antenna and the radio according to the states of the folder casings and the antenna, and according to the transmission/reception mode.

17 Claims, 9 Drawing Sheets

ANTENNA IMPEDANCE MATCHING DEVICE AND METHOD FOR A PORTABLE RADIO TELEPHONE

CROSS REFERENCES TO RELATED APPLICATIONS

This application claims the benefit of Korean patent application No. 1999-30587, filed on Jul. 27, 1999, the entirety of which is hereby incorporated by reference for all purposes as if fully set forth herein.

BACKGROUND OF THE INVENTION

1. Field of the Invention

The present invention relates to a device for matching an antenna impedance in a portable radio telephone, and more particularly, to a device for matching an antenna impedance in a portable radio telephone, for maintaining an optimal antenna impedance matching state.

2. Background of the Related Art

The portable radio telephone of a folder type, or a type similar to the folder type, is provided with an upper casing and a lower casing for protecting a display and a keypad. Since an antenna related impedance is varied with the state of the casing, (i.e., a folded or closed state and an unfolded or open state), the radio performance characteristics also vary. That is, the radio performance of the portable radio telephone is dependent on the state of the casing. An example of such a portable radio telephone is disclosed in U.S. Pat. No. 5,335,368, wherein a portable radio telephone having a casing is disclosed which maintains a matched state for the antenna impedance in a call waiting state and in an operating state. The portable radio telephone is provided with an upper casing and a lower casing foldably coupled to a body by hinges, a matching circuit between the antenna and a transmitting-and-receiving circuit, and a sensor (a switch) for sensing states (folded or unfolded) of the upper casing and the lower casing for changing an impedance matching state according to a power provided to the sensor.

However, the foregoing device for matching an antenna impedance has the following problem.

First, in the related art, sensors switched mechanically are used for sensing folding and unfolding of the upper casing and the lower casing and matching an impedance of the antenna. Therefore, the sensor is sensitive to mechanical defects, and no antenna related impedance matching dependent on the casing state is possible if mechanical defects occur.

Second, the antenna impedance matching in the related art cannot match the antenna impedance optimally for both when the antenna is extracted and when it is retracted.

Third, the antenna impedance matching in the related art only by sensing the casing state cannot match the antenna impedance optimally for both a reception and a transmission mode.

SUMMARY OF THE INVENTION

Accordingly, the present invention is directed to a device for matching an antenna impedance in a portable radio telephone that substantially obviates one or more of the problems due to limitations and disadvantages of the related art.

An object of the present invention is to provide a device for matching an antenna impedance in a portable radio telephone of a folder type, or a type similar to the folder type, in which an operating mode, a casing state, and an antenna state of the portable radio telephone are detected for matching an optimal antenna related impedance according to respective states.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for matching an antenna impedance in a portable radio telephone includes a folder sensor for sensing a folded state or an unfolded state of the folder casing, a controller for controlling a voltage according to a casing state sensed at the folder sensor, and a matching circuit having a variable capacitance diode for matching an impedance of the antenna and an impedance of a transmission/reception circuit according to the voltage of the controller.

In another aspect of the present invention, there is provided a device for matching an antenna impedance in a portable radio telephone including a radio having transmission and reception circuits, an antenna movable between an extracted position from the telephone and a retracted position into the telephone, means for sensing the extracted or retracted state of the antenna to provide a sensing signal, a controller for providing voltages different from one another in response to the sensing signal from the means, and means for matching an impedance of the antenna and an impedance of the radio according to the voltages from the controller.

In other aspect of the present invention, there is provided a device for matching an antenna impedance in a portable radio telephone including a radio having transmission and receiving circuits, a foldable casing enclosing the radio, the foldable casing movable between an unfolded position and a folded position, an antenna movable between an extracted position from the foldable casing and a retracted position into the foldable casing, means for sensing whether the foldable casing is in the unfolded position and for sensing whether the antenna is in the extracted position, and for providing a sensing signal in response thereto, and means for matching an impedance of the antenna and an impedance of the radio in response to the sensing signal.

In a further aspect of the present invention, there is provided a device for matching an antenna impedance in a portable radio telephone, including a radio having transmission and receiving circuits, a foldable casing enclosing the radio, the foldable casing movable between an unfolded position and a folded position, an antenna movable between an extracted position from the foldable casing and a retracted position into the foldable casing, means for sensing whether the foldable casing is in the unfolded position and for sensing whether the antenna is in the extracted position, and for providing a sensing signal in response thereto, a measure for providing a RF signal to the antenna, or measuring a RF signal from the antenna, a controller for controlling the measure to provide the RF signal to the antenna in a reception mode and to measure the RF signal from the antenna in a transmission mode, and for determining optimal antenna impedance matching values for respective modes and folder casing and antenna states and storing the optimal matching values, and means for matching an impedance of the antenna and an impedance of the radio in response to the sensing signal in actual use by, under the control of the controller, boosting a voltage by a fixed increment from 0V to a fixed level for every folder casing state, antenna state, transmission and reception mode condition to vary an antenna impedance matching, for the controller to measure a transmission or reception sensitivity every time the antenna impedance matching is varied, to set an optimal antenna impedance matching value for each of the states, and to store the optimal antenna impedance matching values therein.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

First Embodiment

Figure 1:
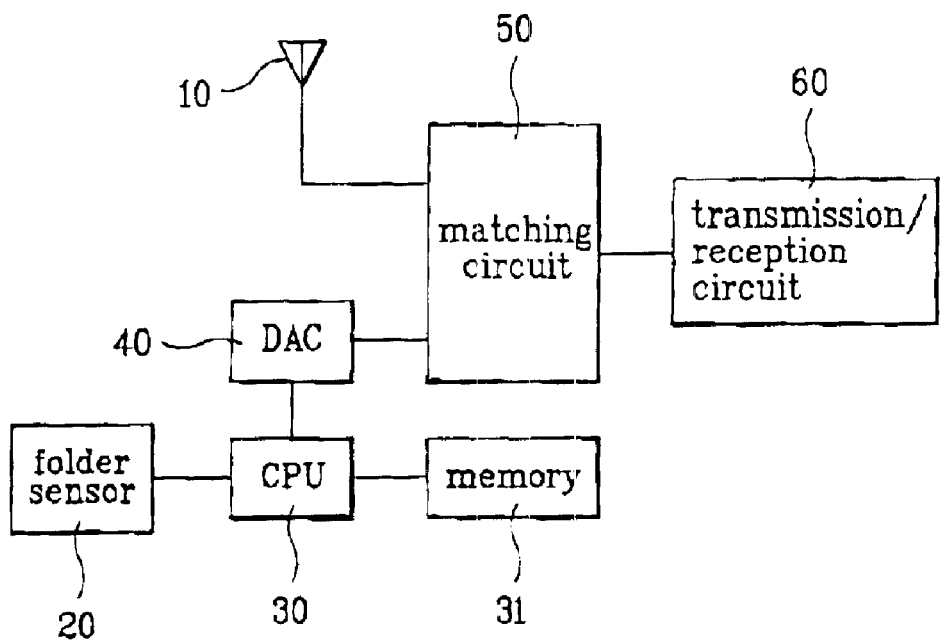
FIG. 1 illustrates a block diagram of a device for matching an antenna impedance in a portable radio telephone in accordance with a first preferred embodiment.

FIG. 1 illustrates a block diagram of a device for matching an antenna impedance in a portable radio telephone in accordance with a first preferred embodiment.

Figure 2:
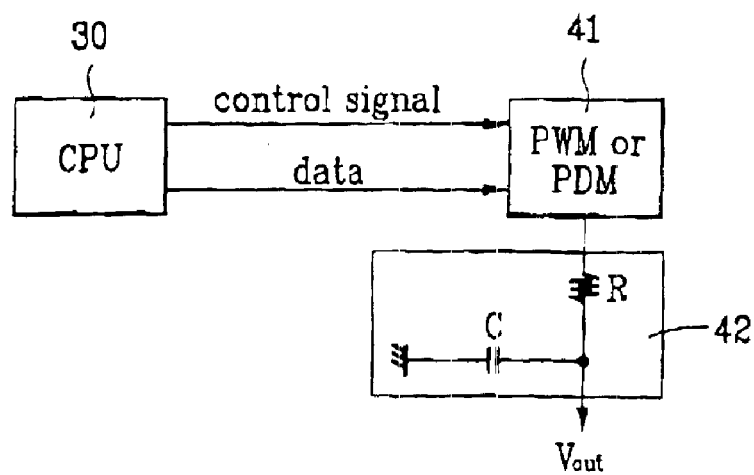
FIG. 2 illustrates a detailed system of the digital-to-analog converter (DAC) in FIG. 1.

Referring to FIG. 1, the device for matching an antenna impedance in a portable radio telephone in accordance with a first preferred embodiment includes an antenna 10, a folder sensor 20, a central processing unit (CPU) 30, a Digital-to-Analog Converter (DAC) 40, a matching circuit 50, transmission/reception circuit 60, and a non-volatile memory 31. The antenna 10 receives a radio wave signal from the air and provides the signal to a matching circuit 50, or transmits a signal from the matching circuit 50 to the air. The folder sensor 20 has a permanent magnet and a magnetic sensor for sensing a folded or unfolded state of a casing of the portable radio telephone, and communicating the state to the CPU 30. The non-volatile memory 31 stores a voltage value corresponding to a state of the folder sensor, and the CPU 30 reads the stored voltage value from the non-volatile memory 31 according to a state that the folder sensor 20 senses. The DAC 40 converts a voltage from the CPU 30 into analog signal for controlling matching of the matching circuit 50. A detailed embodiment of the DAC is illustrated in FIG. 2.

That is, the DAC has a variable pulse generator, which may be a Pulse Width Modulator (PWM) or a Pulse Density Modulator (PDM), for receiving a control signal and a data signal from the CPU 30 and varying a pulse width or a pulse density, and a integrating circuit 42 having a resistor R and a capacitor C for integrating a signal from the variable pulse generator 41 and providing it to the matching circuit 5. Accordingly, under the control of the CPU 30, if the pulse width from the variable pulse generator 41 is relatively large or the pulse density therefrom is relatively high, a high DC control voltage is provided, and if relatively small or relatively low, a low DC control voltage is provided. The matching circuit 50 is directly connected to the antenna 10 for performing impedance matching when a transmission/reception signal is transmitted between the antenna 10 and the transmission/reception circuit 60. The transmission/reception circuit 60 processes a signal received through the matching circuit 50, or provides a signal to the antenna 10 through the matching circuit 50.

Figure 3:
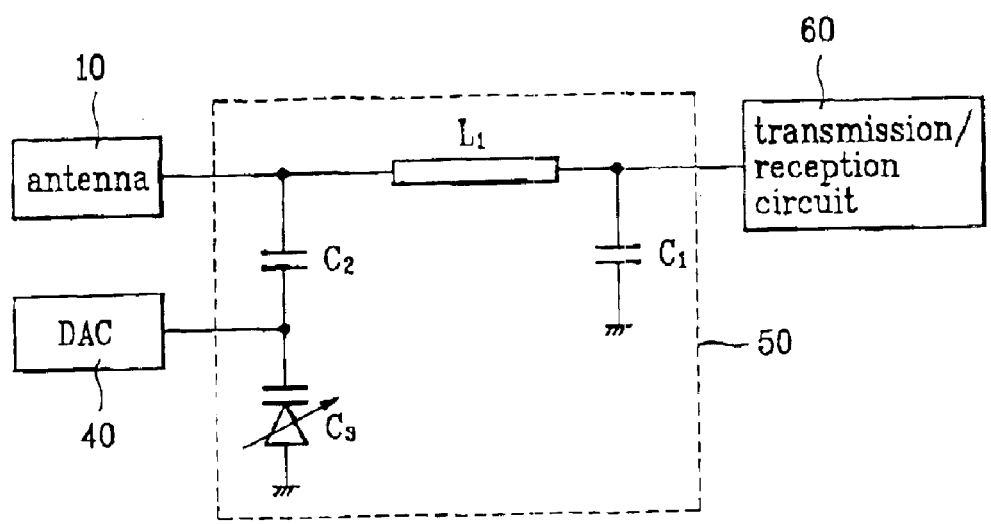
FIG. 3 illustrates a detailed system of the matching circuit in FIG. 1.

A first embodiment matching circuit 50 is as shown in FIG. 3. FIG. 3 illustrates a detailed system of the first embodiment matching circuit in FIG. 1.

Referring to FIG. 3, the matching circuit 50 comprises a 'π' circuit, inclusive of an inductor L1 between the antenna 10 and the transmission/reception circuit 60, a first capacitor C1 connected between the transmission/reception circuit 60/inductor L1 and ground, and a second capacitor C2 and a variable capacitance diode, or varactor, C3 connected in series between the antenna 10/inductor L1 and ground. The DAC 40 is connected between the second capacitor C2 and the variable capacitance diode, or varactor, C3. Therefore, a capacitance of the variable capacitance diode, or varactor, C3 is varied with a control voltage from the DAC 40.

Figure 4:
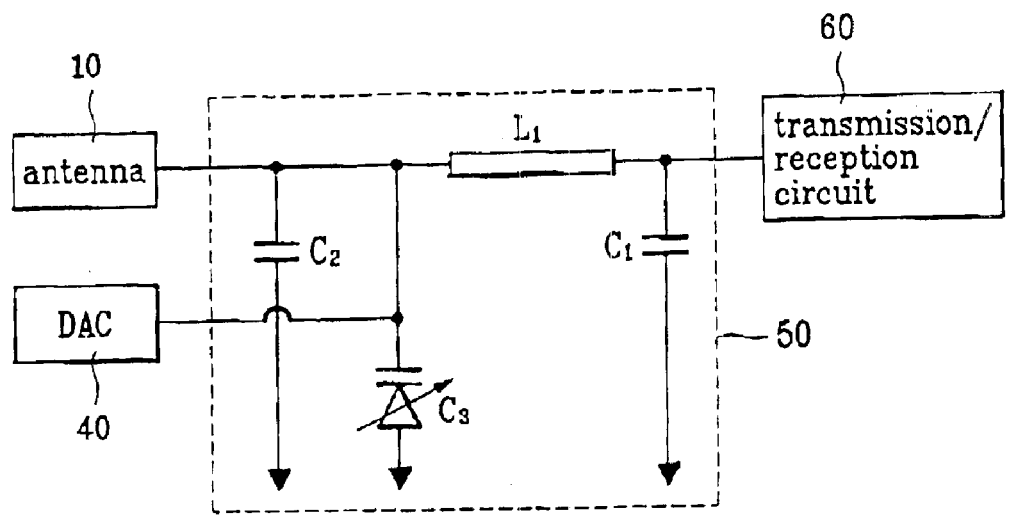
FIG. 4 illustrates a detailed system of the matching circuit in FIG. 1 in accordance with a second preferred embodiment.

In the meantime, a second embodiment matching circuit 50 is as shown in FIG. 4. FIG. 4 illustrates a detailed system of the second embodiment of the matching circuit 50 in FIG. 1.

Figure 5:
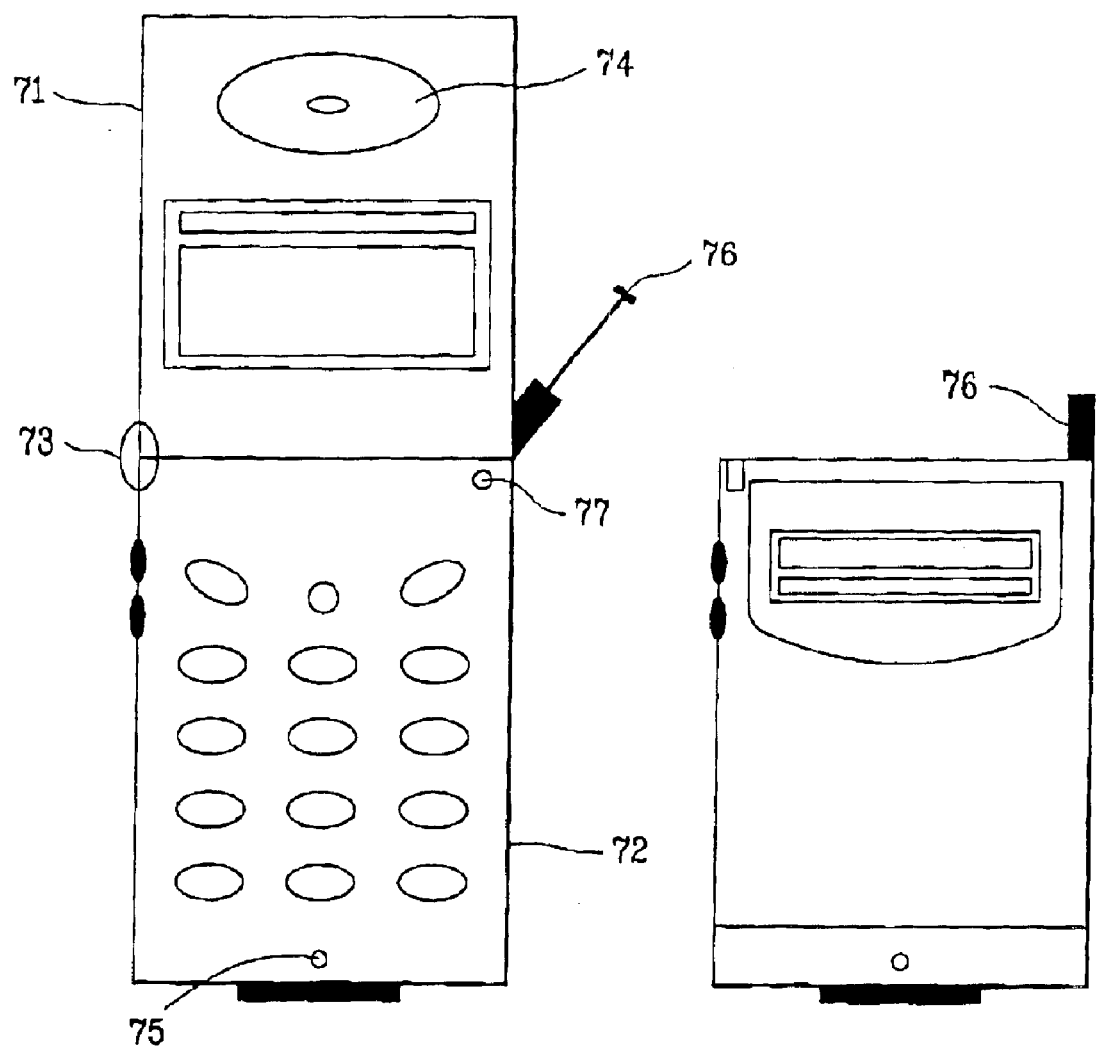
FIG. 5 illustrates an outer appearance of a portable radio telephone in accordance with a first preferred embodiment.

Referring to FIG. 4, the matching circuit 50 comprises a 'π' circuit, inclusive of an inductor L1 between the antenna 10 and the transmission/reception circuit 60, a first capacitor C1 connected between the transmission/reception circuit 60/inductor L1 and ground, and a second capacitor C2 and a variable capacitance diode, or varactor, C3 each respectively connected between the antenna 10/inductor L1 and ground. The DAC 40 is connected between the inductor L1 and the variable capacitance diode, or varactor, C3. Therefore, a capacitance of the variable capacitance diode, or varactor, C3 is varied with a control voltage from the DAC 40. FIG. 5 illustrates an outer appearance of a portable radio telephone in accordance with a first preferred embodiment.

Referring to FIG. 5, the outer appearance of a portable radio telephone in accordance with a first preferred embodiment of the present invention shows an upper casing 71 and a lower casing 72, both of which are foldably coupled with a hinge 73. There is a reception speaker 74 in the upper casing 71 and a transmission speaker 75 and an antenna 76 in the lower casing. There is a folder sensor 77 fitted to the lower casing 72 for detecting a folded or unfolded state of the upper casing 71 and the lower casing 72. That is, the folder sensor 77 has a permanent magnet fitted to a position of the upper casing 71, and a magnetic sensor fitted to the lower casing 72 at a position opposite to the permanent magnet in the upper casing 71. Positions of the reception speaker 74, the transmission speaker 75, the antenna 76, and the folder sensor 77 are not limited to the above, but shown for convenience of explanation. That is, the reception speaker 74 may be fitted to the lower casing 72, both the transmission speaker 75 and the antenna 76 may be fitted to the upper casing 71, and the magnet and the magnetic sensor in the folder sensor may exchange their positions in the lower and upper casings 72 and 71.

The operation of the aforementioned device for matching an antenna impedance in accordance with a first preferred embodiment will be explained.

The manufacturer of the portable radio telephone stores voltages for optimal antenna impedance matching both in a case opened condition and case closed condition to the non-volatile memory 31. The folder sensor 20 or 77 shown in FIG. 1 or 5 senses the upper casing 71 and the lower casing 72 of the portable radio telephone being in a closed state or an opened state, and informs the CPU 30. That is, the folder sensor 20 or 77 having a permanent magnet and a magnetic sensor senses states of the casings by the magnetic sensor, and informs the states to the CPU 30. Then, the CPU 30 recognizes the casing states sensed at the folder sensor 20, and reads the data stored in the non-volatile memory 31 according to the casing state, to control the DAC 40 to provide a predetermined control voltage, and the DAC 40 controls impedance matching of the matching circuit 50 under the control of the CPU 30. For example, if the casing is closed, the CPU 30 controls the variable pulse generator 41 in the DAC 40 to provide pulses with relatively small widths or with relatively low densities, to generate a control voltage, for example 1V, and provide it to the matching circuit 50, and, conversely, if the casing is opened, the CPU 30 controls the variable pulse generator 41 in the DAC 40 to provide pulses with relatively large widths or with relatively high densities, to generate a control voltage, for example 3V, and provide it to the matching circuit 50. According to this, the matching circuit 50 adjusts a capacitance to achieve an optimal impedance matching when the matching circuit 50 transfers a transmission/reception signal between the antenna 10 and the transmission/reception circuit 60 according to the control voltage from the DAC 40. That is, with reference to FIGS. 3 and 4, the variable capacitance diode, or varactor, C3 has a capacitance varied with the control voltage from the DAC 40; i.e., if the control voltage from the DAC 40 is high, the capacitance is also great. In other words, an overall impedance matching for the inductor L, the first capacitor C1, the second capacitor C2, and the variable capacitance diode, or varactor, C3 is adjusted by varying the capacitance of the variable capacitance diode, or varactor, C3 depending on the state of the casing, for achieving an optimal impedance matching according to the casing state when the matching circuit 50 transfers a transmission/reception signal between the antenna 10 and the transmission/reception circuit 60. In this instance, in FIGS. 3 and 4, the difference between the matching circuits 50 is whether the second capacitor C2 and the variable capacitance diode, or varactor, C3 are connected in series or parallel. Therefore, an equivalent capacitance of the second capacitor C2 and the variable capacitance diode, or varactor, C3 is varied with a state of the variable capacitance diode, or varactor, C3.

Second Embodiment

Figure 6:
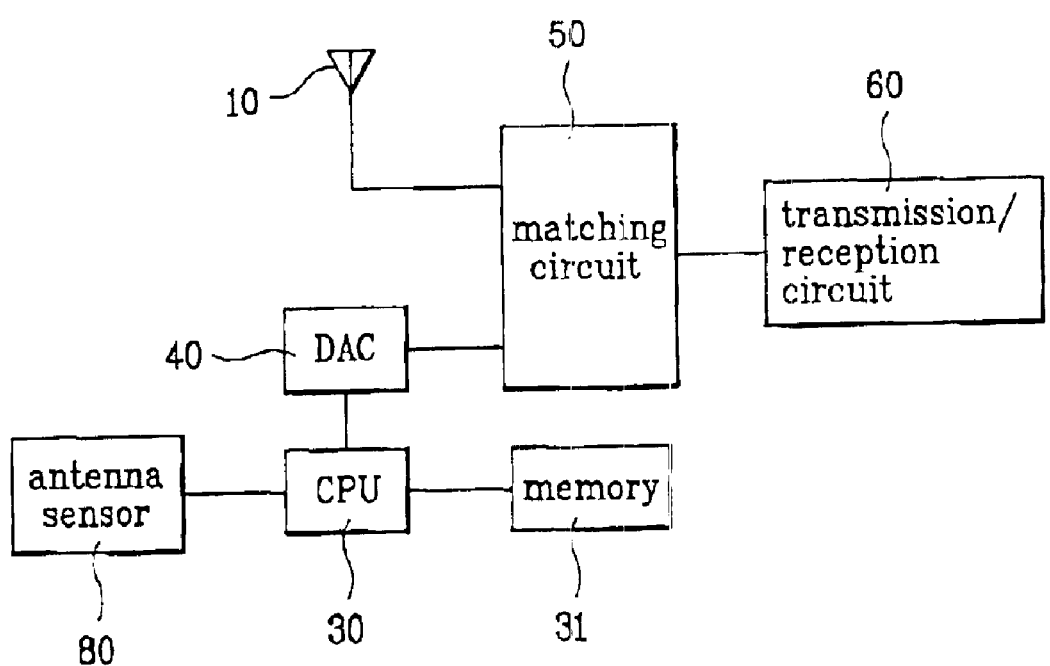
FIG. 6 illustrates a block diagram of a device for matching an antenna impedance in a portable radio telephone in accordance with a second preferred embodiment.

A device for matching an antenna impedance in a portable radio telephone in accordance with a second preferred embodiment will be explained. FIG. 6 illustrates a block diagram of a device for matching an antenna impedance in a portable radio telephone in accordance with a second preferred embodiment, FIG. 7A illustrates an outer appearance of a device for matching an antenna impedance in a portable radio telephone in accordance with a second preferred embodiment, and FIG. 7B illustrates a circuit of the CPU and the antenna sensor in FIG. 7A.

Referring to FIG. 6, the device for matching an antenna impedance in a portable radio telephone in accordance with a second preferred embodiment includes an antenna 10, an antenna sensor 80, a CPU 30, a DAC 40, a matching circuit 50, a transmission/reception circuit 60, and a non-volatile memory 31. The antenna sensor 80 senses the antenna 10 being extracted out of the case or retracted into the casing. And, the rest of the parts in FIG. 6 have functions the same as the first embodiment, but the CPU 30 provides a control signal for controlling a voltage in response to a signal from the antenna sensor 80, in lieu of the folder sensor 20.

An outer appearance of a device for matching an antenna impedance in a portable radio telephone in accordance with a second preferred embodiment will be explained.

Figure 7A:
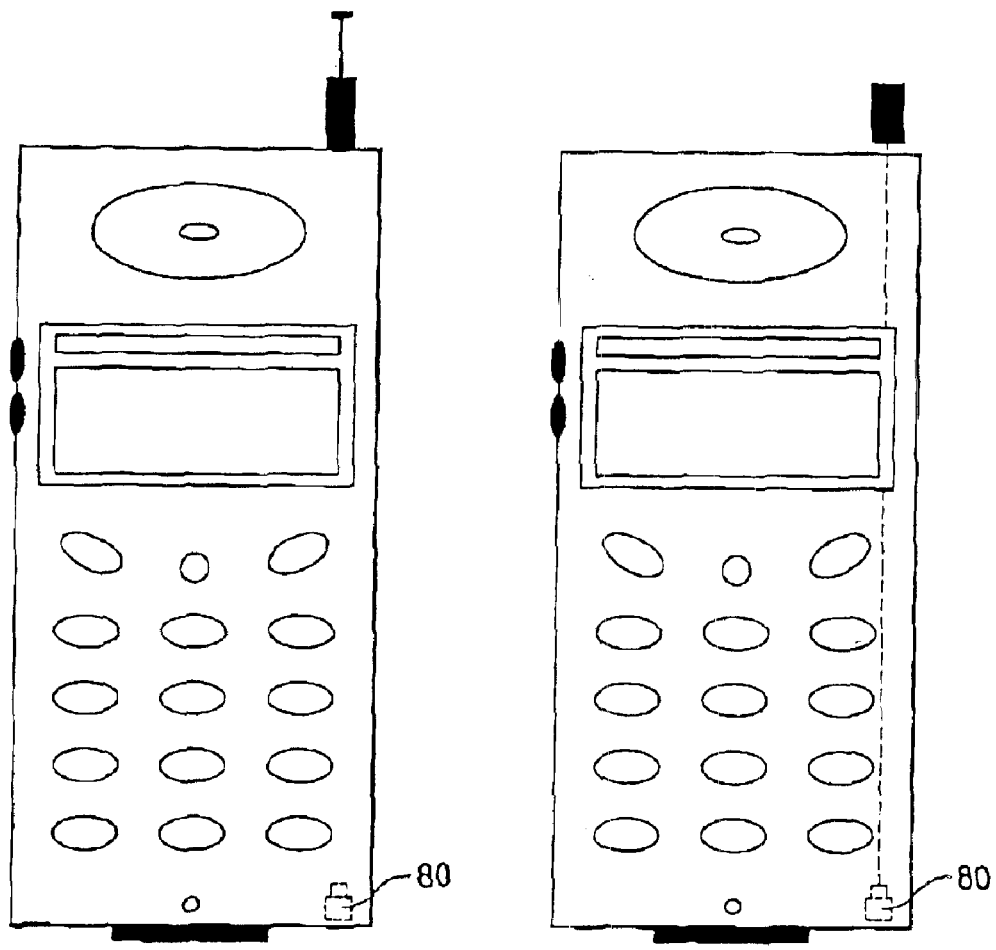
FIG. 7A illustrates an outer appearance of a device for matching an antenna impedance in a portable radio telephone in accordance with a second preferred embodiment.
Figure 7B:
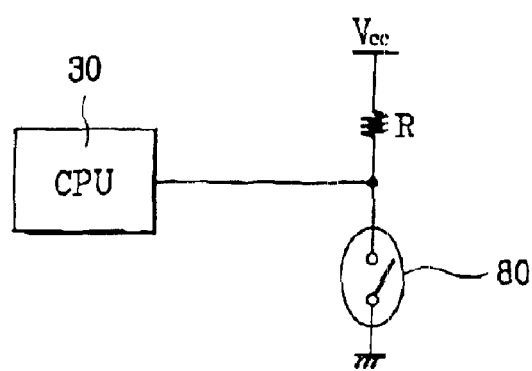
FIG. 7B illustrates a circuit of the CPU and the antenna sensor in FIG. 7A.

Referring to FIG. 7A, the antenna sensor 80 is fitted to a low portion of an antenna line for sensing whether the antenna of the portable radio is in a retracted state in which the antenna is pushed into the portable radio telephone, or in an extracted state in which the antenna is pulled out of the portable radio telephone. The sensor then provides an indication of the state of the antenna to the CPU 30. As shown in FIG. 7B, the antenna sensor 80 has a micro tact switch, or the like. A position of the antenna sensor 80 is not limited to the position shown in FIG. 7A, which is shown as an example for convenience of explanation, and may be fitted to a top portion of the antenna line.

The operation of the device for matching an antenna impedance in accordance with a second preferred embodiment will be explained.

Voltage values for optimal antenna impedance matching for respective antenna states are stored in the non-volatile memory 31. And, as shown in FIGS. 6, 7A and 7B, the antenna sensor 80 senses an antenna state either being extracted or retracted, and informs the CPU 30. That is, if the antenna in the portable radio telephone is retracted into the portable radio telephone, so as to turn on the antenna sensor 80, a logic low signal is provided to the CPU 30. And, if the antenna in the portable radio telephone is extracted from the portable radio telephone, to turn off the antenna sensor 80, a logic high signal is provided to the CPU 30, due to a pull-up resistance R. Accordingly, the CPU 30 recognizes the antenna state sensed at the antenna sensor 80, and reads the data stored in the non-volatile memory 31 according to the antenna state, and controls the DAC 40 to vary the control voltage, and the DAC 40 controls impedance matching of the matching circuit 50 under the voltage control of the CPU 30. And, as explained, the matching circuit 50 adjusts a capacitance so that an optimal impedance matching can be achieved when the matching circuit 50 transfers a transmission/reception signal between the antenna 10 and the transmission/reception circuit 60.

Third Embodiment

Figure 8:
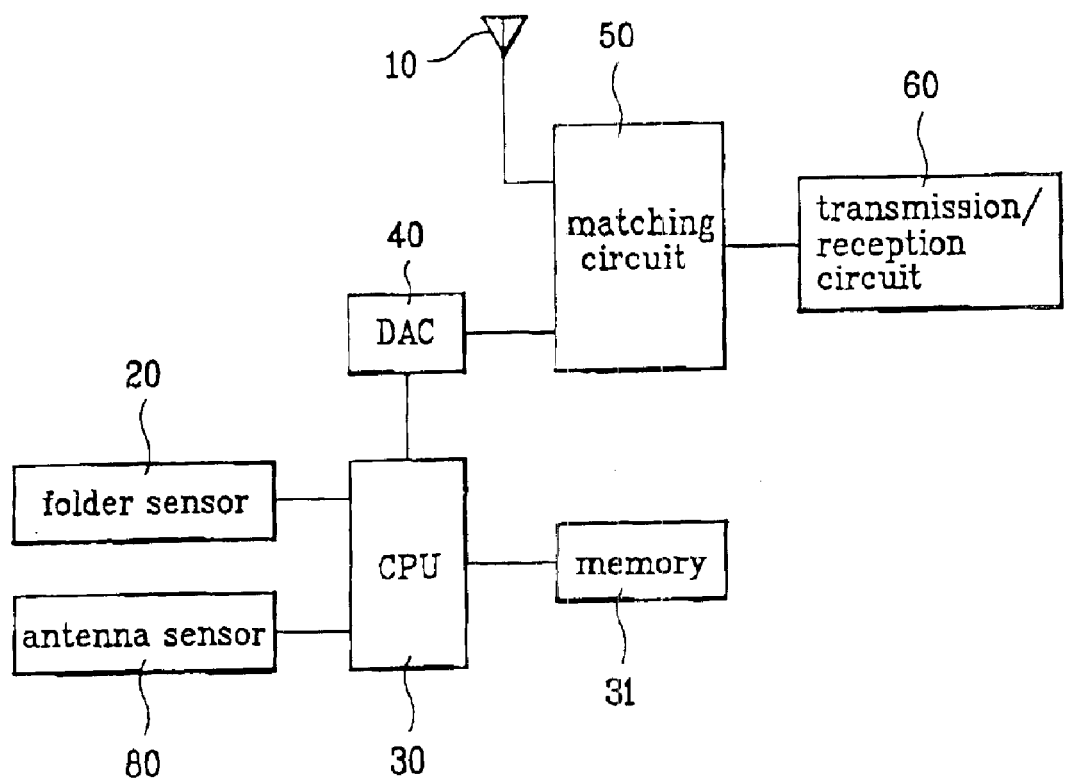
FIG. 8 illustrates a block diagram of a device for matching an antenna impedance in a portable radio telephone in accordance with a third preferred embodiment.

A device for matching an antenna impedance in a portable radio telephone in accordance with a third preferred embodiment will be explained. FIG. 8 illustrates a block diagram of a device for matching an antenna impedance in a portable radio telephone in accordance with a third preferred embodiment.

Referring to FIG. 8, the device for matching an antenna impedance in a portable radio telephone in accordance with a third preferred embodiment includes an antenna 10, a folder sensor 20, an antenna sensor 80, a CPU 30, a DAC 40, a matching circuit 50, a transmission/reception circuit 60, and a non-volatile memory 31. The folder sensor 20 senses a folded or unfolded state of a telephone casing, the antenna sensor 80 senses whether the antenna is extracted or retracted from/to the telephone, and respectively informs the CPU 30. The non-volatile memory 31 stores voltage values for optimal antenna impedance matching according to casing states and antenna states. The CPU 30 determines the casing and antenna states from the folder sensor 20 and the antenna sensor 80, respectively. That is, the CPU 30: determines a state wherein the casing is opened and the antenna is extracted, a state wherein the casing is opened and the antenna is retracted, a state wherein the casing is closed and the antenna is extracted, and a state wherein the casing is closed and the antenna is retracted; reads data from the non-volatile memory 31 according to the determined state; and provides a corresponding voltage for each state. That is, voltages which can provide impedances proper to each of the states are stored in the non-volatile memory 31, and one of which is forwarded. That is, the voltages for the casing and antenna states are as shown in table 1, below.

| casing | antenna | voltage |
|--------|---------|---------|
| closed | extracted | V1 |
| closed | retracted | V2 |
| opened | extracted | V3 |
| opened | retracted | V4 |

Fourth Embodiment

Figure 9:
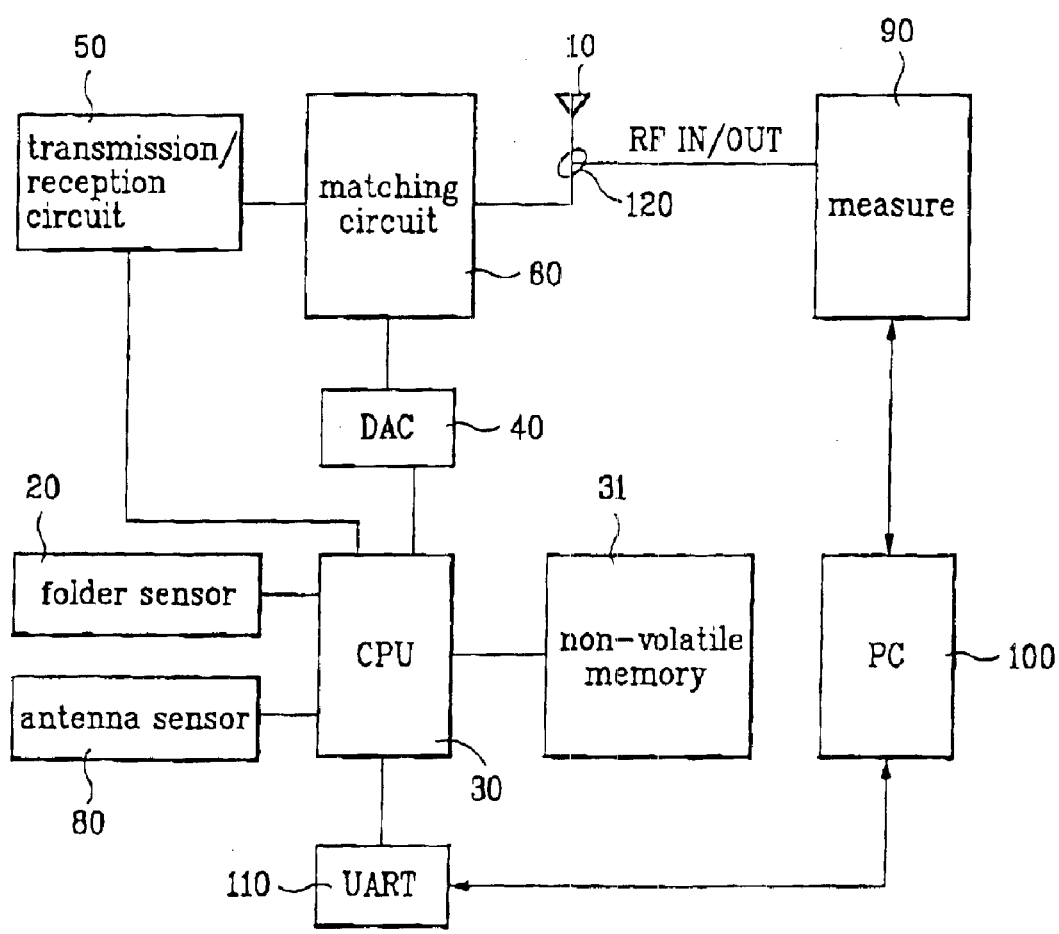
FIG. 9 illustrates a block diagram of a device for matching an antenna impedance in a portable radio telephone in accordance with a fourth preferred embodiment.

A device for matching an antenna impedance in a portable radio telephone in accordance with a fourth preferred embodiment will be explained. FIG. 9 illustrates a block diagram of a device for matching an antenna impedance in a portable radio telephone in accordance with a fourth preferred embodiment. Variables in the antenna impedance matching of a portable radio telephone, such as, not only the opened or closed state of the casing and the antenna extraction/retraction states, but also telephone transmission and reception states, and optimal matching values according to the above conditions for a specific telephone set, may differ, therefore, the above conditions should be taken into account for an optimal matching of the antenna impedance. That is, since the operating frequency differs between a reception mode and a transmission mode, and every telephone set has its own optimal matching value, an optimal matching for the casing states and the antenna states under the above conditions is required. Therefore, in the fourth embodiment, a device is suggested for matching an antenna impedance in a portable radio telephone which can perform an optimal antenna impedance matching even in the above conditions.

Referring to FIG. 9, the device for matching an antenna impedance in a portable radio telephone in accordance with a fourth preferred embodiment includes an antenna 10, a folder sensor 20, an antenna sensor 80, a CPU 30, a DAC 40, a matching circuit 50, a transmission/reception circuit 60, a measurement device 90, a Personal Computer (PC) 100, a Universal Asynchronous Receiver/Transmitter (UART) 110. The folder sensor 20 senses a folded or unfolded state of a telephone casing, the antenna sensor 80 senses the antenna being extracted or retracted from/to the telephone set, and respectively informs the CPU 30. The PC 100 stores control signals for measuring frequencies transmitted/received through the antenna, and optimal data values under the above conditions, and the measurement device 90 has an antenna coupler 120 coupled to the antenna 10 for providing an RF signal having a frequency to the antenna 10 or measuring an RF frequency provided from the antenna. In a reception mode, under the control of the PC 100, the CPU 30: determines the casing and antenna states from the folder sensor 20 and the antenna sensor 80 respectively; receives an RF signal through the antenna 10 and the transmission/reception circuit 60; boosts the DAC output voltage by a 0.5V increment from 0V to a certain level (255V) gradually to vary the antenna impedance matching; measures a Rx reception sensitivity; and provides the reception sensitivity to the PC 100 through the UART 110 every time the antenna matching impedance is varied. And, upon determination of an optimal antenna impedance matching value, the CPU 30 stores the optimal antenna impedance matching value to the non-volatile memory 31. In a transmission mode, under the control of the PC 100, the CPU 30: boosts the DAC output voltage by a 0.5V increment from 0V to a certain level (255V) gradually to vary the antenna impedance matching; causing the PC 100 to measure the Tx transmission level every time the antenna impedance matching is varied; and, upon reception of the optimal antenna impedance matching from the PC 100, the CPU 30 stores the optimal antenna impedance matching to the non-volatile memory 31. According to this method, the CPU 30 can store optimal antenna impedance matching values for the states wherein the casing is opened and the antenna is extracted, the casing is opened and the antenna is retracted, the casing is closed and the antenna is extracted, and the casing is closed and the antenna is retracted, and for a reception mode and a transmission mode, and provides different control voltages depending on the states. That is, the CPU 30 stores voltages which can provide impedances proper to respective states in the memory 31, and forwards one of the voltages.

Figure 10:
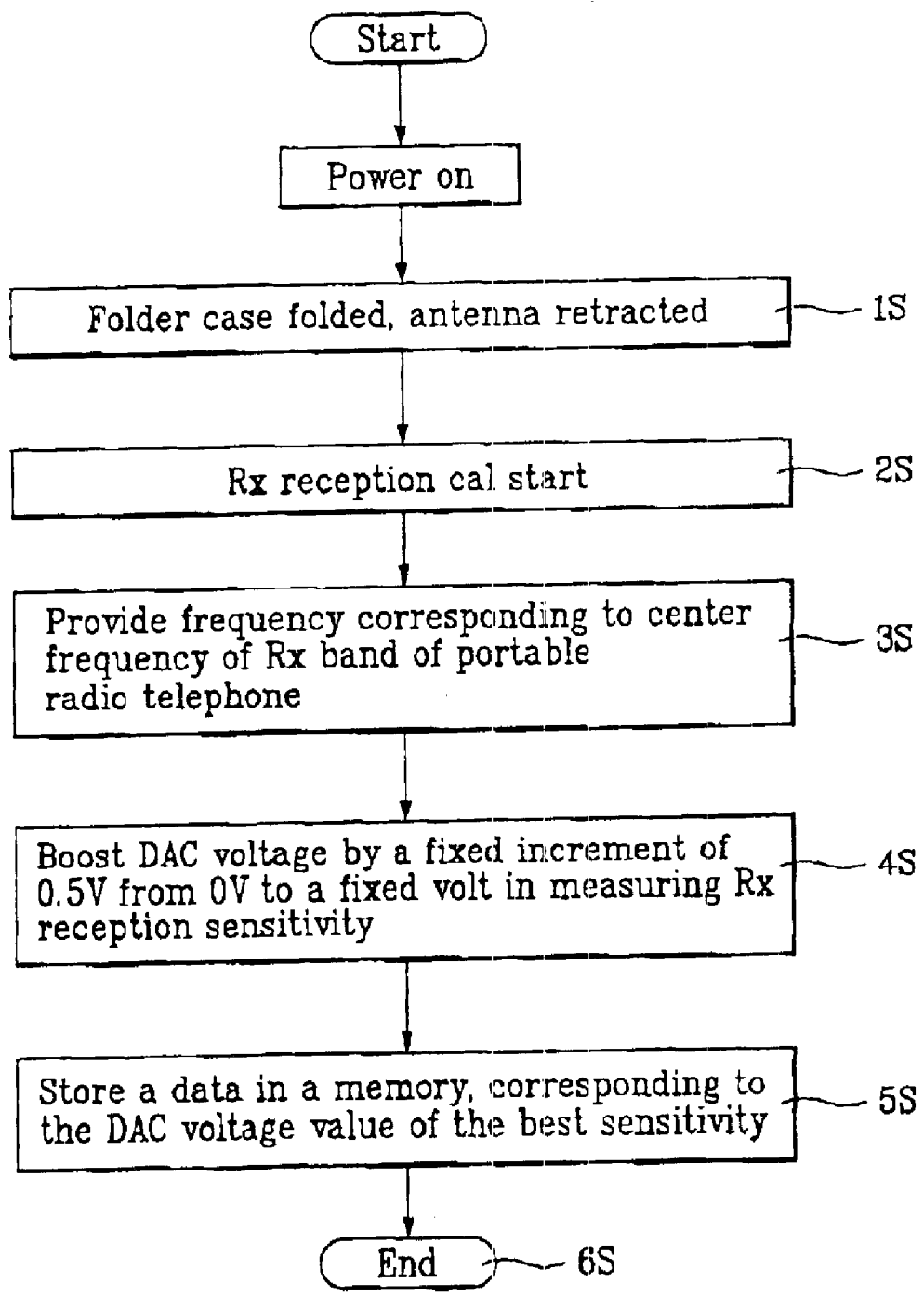
FIG. 10 illustrates a flow chart showing a first embodiment method for storing an optimal antenna impedance matching value in accordance with a fourth preferred embodiment; and, FIG. 11 illustrates a flow chart showing a second embodiment method for storing an optimal antenna impedance matching value in accordance with a fourth preferred embodiment.

A method for matching an antenna impedance in a radio telephone in accordance with a fourth preferred embodiment will be explained. FIG. 10 illustrates a flow chart showing a preferred embodiment method for storing an optimal antenna impedance matching value for a reception mode in a fourth preferred embodiment.

First, a reception mode will be explained. When the casing is closed, the antenna is retracted, and the radio telephone is in a reception mode (1S and 2S), a method for setting an optimal antenna impedance matching value will be explained. That is, in the reception mode, the measurement device 90 is controlled through the PC 100, such that the measurement device 90 provides an RF signal with a frequency matching the center frequency of the reception band (Rx band) of the portable radio telephone. When the measurement device 90 provides the RF signal, the RF signal is provided to the antenna 10 by the antenna coupler 120 (3S). Then, the CPU 30, while receiving the RF signal through the antenna 10, the matching circuit 50, and the transmission/reception circuit 60, boosts the DAC output voltage by a 0.5V increment from 0V to a certain level (255V) gradually, to vary the antenna impedance matching, and measures a Rx reception sensitivity and provides the reception sensitivity to the PC 100 through the UART 110 every time the antenna impedance matching is varied (4S). Thus, if the antenna impedance matching is varied, the PC 100 forms a table of the Rx reception sensitivity measurement results, and commands the CPU 30 to store a DAC voltage value corresponding to the Rx reception value (5S) of the best sensitivity, and the CPU 30 stores the voltage value at a relevant table position of the memory 31 (for example, Rx_center_fold_DAC), and terminates a reception call (6S). Thus, after the adjusted value is stored at the relevant table position of the non-volatile memory 31, in actual use, the CPU 30 adjusts the matching circuit 50 with reference to the value when the casing is closed, the antenna is retracted, and the radio telephone is in the reception mode.

According to identical methods, the Rx reception sensitivity measurement results are formed into tables for the states wherein the casing is closed and the antenna is retracted, the casing is opened and the antenna is retracted, and the casing is opened and the antenna is extracted. DAC voltage values corresponding to Rx reception values of the best sensitivity for each case are stored at relevant table positions of the non-volatile memory 31, and reception calls are terminated.

Alternatively, instead of the center frequency of the reception band, the measurements may be made to provide a high frequency or a low frequency of the reception band, and, by the same method, the Rx reception sensitivity measurement results are stored into tables, DAC voltage values corresponding to Rx reception values of the best sensitivity for each case are stored at relevant table positions of the non-volatile memory 31, and the values may be used in the antenna impedance matching.

Figure 11:
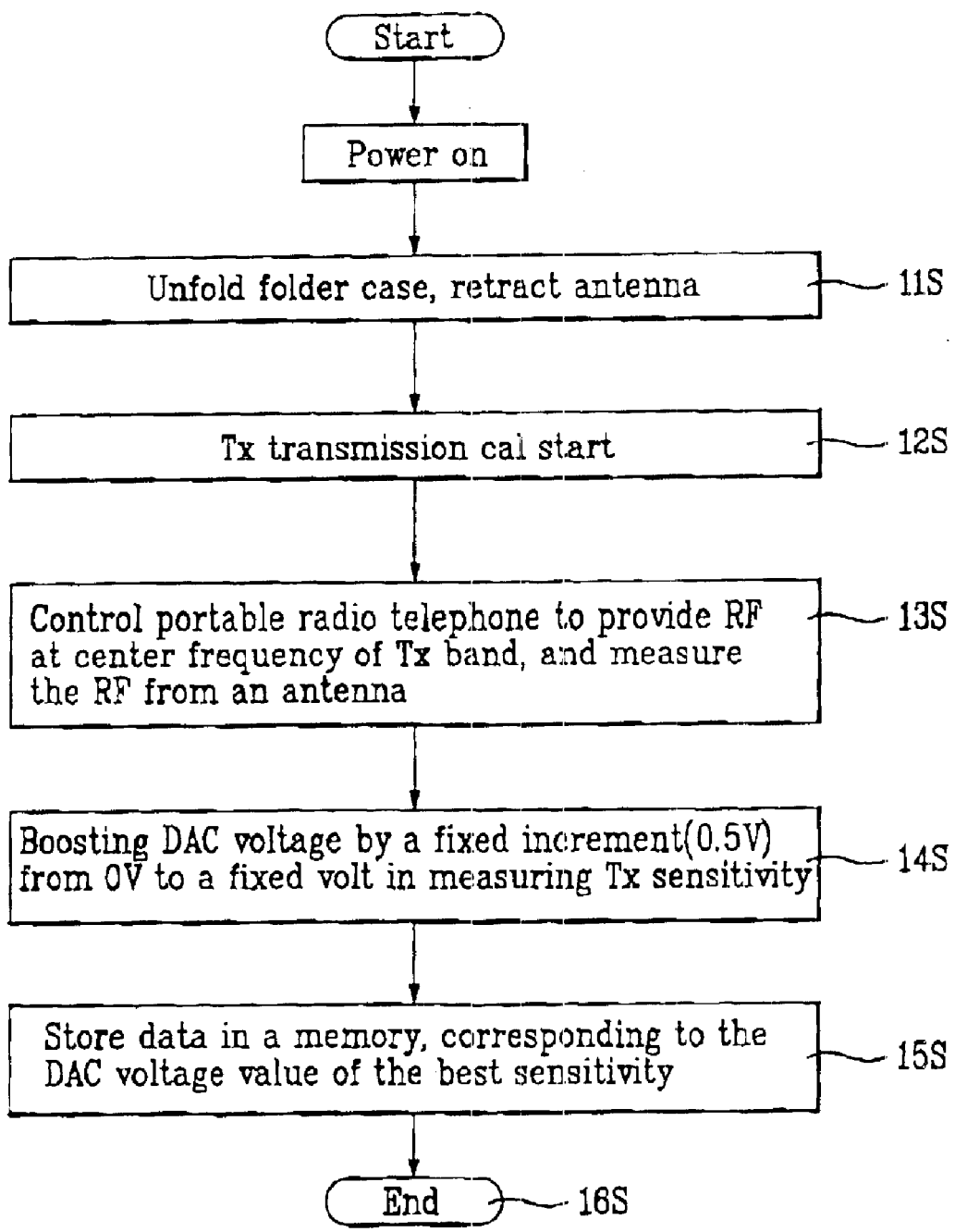

A method for setting an optimal antenna impedance matching value in a transmission mode will be explained. FIG. 11 illustrates a flow chart showing a preferred embodiment method for storing an optimal antenna impedance matching value for a reception mode in a fourth preferred embodiment.

When the casing is opened and the antenna is retracted (11S and 12S), the measurement device 90 is controlled through the PC 100, such that the measurement device 90 measures the RF signal from the antenna 10 in the portable radio telephone (13S). And, the PC 100 controls the CPU 30 through the UART 110, such that the CPU 30 controls the transmission/reception circuit to transmit at a center frequency of the transmission band (Tx band). Under this state, the CPU 30 boosts the DAC output voltage by a 0.5V increment from 0V to a certain level (255V) gradually, to vary the antenna impedance matching, and provides a voltage value to the PC 100 through the UART 110 every time the antenna impedance matching is varied (14S). Thus, if the CPU 30 varies, and forwards the antenna impedance matching value, the PC 100 stores the Tx output level measurement from the measurement device 90 into a table, and commands the CPU 30 to store a DAC voltage value corresponding to Tx reception value (15S) of the best output level, and the CPU 30 stores the voltage value at a relevant table position of the memory 31 (for example, Tx_center_fold_DAC), and terminates a transmission call (16S). Thus, after the adjusted value is stored at the relevant table position of the non-volatile memory 31, in actual use, the CPU 30 adjusts the matching circuit 50 with reference to the value in the case wherein the casing is closed, the antenna is retracted, and the radio telephone is in the transmission mode.

According to identical methods, resultants of the Tx transmission sensitivity measurement are stored into tables for the states wherein the casing is closed and the antenna is extracted, the casing is opened and the antenna is retracted, and the casing is opened and the antenna is extracted. DAC voltage values corresponding to Tx transmission values of the best output level for each case are stored at relevant table positions of the non-volatile memory 31, and a transmission call is terminated.

Alternatively, instead of the center frequency of the transmission band, the CPU 30 may be made to control the transmission/reception circuit to provide a high frequency or a low frequency of the transmission band Tx band, and, by the same method, Tx transmission sensitivity measurement results are stored into tables, DAC voltage values corresponding to Tx transmission values of the best output level for each case are stored at relevant table positions of the non-volatile memory 31, and the values may be used in the antenna impedance matching.

The DAC output voltages stored in the non-volatile memory according to the method for the optimal antenna impedance matching are as shown on table 2, below. Once the voltage values corresponding to respective states are stored in the non-volatile memory 31, the CPU 30 identifies transmission/reception modes, and a folder casing state and an antenna state from respective sensors, reads the pertinent data, and adjusts a matching value.

| Mode of telephone | casing | antenna | output voltage |
|---|---|---|---|
| reception mode | closed | retracted | V1 |
| reception mode | closed | extracted | V2 |
| reception mode | opened | retracted | V3 |
| reception mode | opened | extracted | V4 |
| transmission mode | closed | retracted | V5 |
| transmission mode | closed | extracted | V6 |
| transmission mode | opened | retracted | V7 |
| transmission mode | opened | extracted | V8 |

As has been explained, the device for matching an antenna impedance in a portable radio telephone as described herein has the following advantages.

First, the antenna impedance matching with an optimal value according to the casing state, by sensing a folded or unfolded state of the portable radio telephone, permits enhanced radio performance.

Second, the antenna impedance matching with an optimal value according to the antenna state, by sensing an extracted or retracted state of the antenna in the portable radio telephone, permits enhanced radio performance.

Third, the antenna impedance matching with an optimal value according to both the casing state and the antenna state, by sensing the casing state and the antenna state of the portable radio telephone, permits enhanced radio performance.

Fourth, the antenna impedance matching with an optimal value according to the mode state, the casing state, and the antenna state, by sensing the mode state, the casing state and the antenna state of the portable radio telephone, permits enhanced radio performance. It will be apparent to those skilled in the art that various modifications and variations can be made in the device for matching an antenna impedance in a portable radio telephone of the present invention without departing from the spirit or scope of the invention. Thus, it is intended that the present invention cover the modifications and variations of this invention provided they come within the scope of the appended claims and their equivalents.

What is claimed is:

1. A device for matching an antenna impedance in a portable radio telephone that includes transmission and receiving circuits, a foldable casing, the foldable casing movable between an unfolded position and a folded position, and an antenna movable between an extracted position from the foldable casing and a retracted position into the foldable casing, the device comprising:

means for storing a plurality of digital voltages wherein each digital voltage is associated with a corresponding radio telephone configuration, wherein the configuration is defined by the foldable casing position, the antenna position, and whether the radio telephone is in transmitting mode or receiving mode;

means for determining the foldable casing position, the antenna position, and whether the radio telephone is in transmitting or receiving mode, and for providing a first signal in response thereto; and, means for matching the impedance of the radio telephone antenna in response to the first signal, wherein the means for matching uses a digital voltage, from among the plurality of digital voltages, corresponding to the first signal.

2. A device as claimed in claim 1, wherein the means for matching impedances includes:
   a controller for receiving the sensing signal, and for providing the digital voltage corresponding to the first signal;
   a digital-to-analog converter for converting the digital voltage into an analog voltage; and
   a matching circuit for matching the impedance of the antenna in response to the analog voltage.

3. A device as claimed in claim 2, wherein the matching circuit includes:
   an inductor connected between the antenna and the transmission/reception circuit;
   a first capacitor having a first end connected to the inductor and the transmission/reception circuit, and having a second end grounded;
   a second capacitor and a variable capacitance diode connected in series between the antenna and ground;
   wherein a capacitance of the variable capacitance diode is varied according to the analog voltage.

4. A device as claimed in claim 2, wherein the matching circuit includes:
   an inductor having a first end connected to the antenna and a second end connected to the transmission/reception circuit;
   a first capacitor having a first end connected to the second end of the inductor and the transmission/reception circuit, and a second end grounded;
   a second capacitor having a first end connected to the antenna and the first end of the inductor, and having a second end connected to ground; and
   a variable capacitance diode having a first end connected to the antenna and the first end of the inductor, and having a second end connected to ground;
   wherein a capacitance of the variable capacitance diode is varied according to the analog voltage.

5. A device for matching an antenna impedance in a portable radio telephone having transmission and receiving circuits, a foldable casing, the foldable casing movable between an unfolded position and a folded position, and an antenna movable between an extracted position and a retracted position, the device comprising:
   means for sensing the position of the foldable casing and the antenna, and for providing a sensing signal in response thereto;
   means for determining optimal antenna impedance values where each value corresponds with a different radio telephone configuration based on the position of the foldable casing and the antenna and whether the portable radio telephone is transmitting or receiving;
   means for storing a voltage corresponding to each of the optimal antenna impedance values; and
   means for matching the antenna impedance based on the sensing signal and a stored voltage corresponding to the sensed position of the foldable casing and the antenna.

6. A device as claimed in claim 5, wherein the means for determining optimal impedance values comprises:
   means for measuring a reception and transmission signal strength;
   means for adjusting a voltage by a fixed increment from 0V to a fixed voltage level;
   means for converting the adjusted voltage into an analog voltage;
   means for setting the impedance of the antenna according to the analog voltage; and
   means for identifying when the means for measuring a reception and transmission signal strength has measured a maximum signal strength, and for determining the analog voltage corresponding to the measured maximum signal strength.

7. A device as claimed in claim 6, wherein the means for matching the impedance comprises:
   an inductor connected between the antenna and the transmission/reception circuit;
   a first capacitor having a first end connected to the inductor and the transmission/reception circuit, and having a second end grounded;
   a second capacitor and a variable capacitance diode connected in series between the antenna and ground;
   wherein a capacitance of the variable capacitance diode is varied according to the analog voltage.

8. A device as claimed in claim 6, wherein the means for matching the impedance comprises:
   an inductor having a first end connected to the antenna and a second end connected to the transmission/reception circuit;
   a first capacitor having a first end connected to the second end of the inductor and the transmission/reception circuit, and a second end grounded;
   a second capacitor having a first end connected to the antenna and the first end of the inductor, and having a second end connected to ground; and
   a variable capacitance diode having a first end connected to the antenna and the first end of the inductor, and having a second end connected to ground;
   wherein a capacitance of the variable capacitance diode is varied according to the analog voltage.

9. The device as claimed in claim 6, wherein the fixed increment is approximately 0.5V.

10. The device as claimed in claim 6, wherein the fixed voltage level is approximately 255V.

11. A method of adjusting an antenna impedance in a portable radio telephone that includes transmission and receive circuits, a foldable casing enclosing the radio, the foldable casing movable between an unfolded position and a folded position, and an antenna movable between an extracted position from the foldable casing and a retracted position into the foldable casing, said method comprising the steps of:
   sensing a configuration of the radio telephone, wherein the configuration is defined by the position of the foldable casing, the position of the antenna and whether the radio telephone is in transmit or receive mode, and providing a sensing signal in response thereto;
   measuring a reception/transmission signal strength at a radio frequency for each of a plurality of antenna impedances and for each of a plurality of radio telephone configurations;
   determining an optimal antenna impedance for each configuration;
   storing a voltage corresponding to the optimal antenna impedance for each configuration; and
   setting the antenna impedance based on the stored voltage, according to the sensing signal provided in response to the sensed radio telephone configuration.

12. The method of claim 11, wherein the determining step comprises:
   adjusting a voltage by a fixed increment from 0V to a fixed voltage level;
   converting the adjusted voltage into an analog voltage; and matching the impedance of the antenna in response to the analog voltage.

13. The method of claim 11, wherein the radio frequency is one of a low frequency, a center frequency, and a high frequency in a receiving/transmitting frequency.

14. A method for matching an antenna impedance in a portable radio telephone that includes a radio having transmission and receiving circuits, a foldable case enclosing the radio, the foldable case movable between an unfolded position and a folded position, and an antenna movable between an extracted position from the foldable case and a retracted position into the foldable case, said method comprising the steps of:

storing a plurality of values; sensing whether the antenna is in the extracted position in transmitting or receiving mode and producing at least one sensing signal in response thereto;

selecting one of the plurality of values that corresponds with the sensing signal; and matching an the antenna impedance in response to the selected value, wherein the matched impedance corresponds with the impedance of the transmission or receiving circuit.

15. A device for matching antenna impedance in a radio telephone that includes a foldable case, said device comprising:

memory for storing a plurality of digital values, each associated with a corresponding telephone configuration, wherein the configuration is defined by the position of the case, the position of the antenna and whether the telephone is transmitting or receiving;

means for sensing the configuration;

means for generating a sensing signal that reflects the sensed configuration; and means for matching the antenna impedance based on a selected one of the stored digital values that corresponds with the sensing signal.

16. The device of claim 15, wherein the means for matching comprises:

a controller for selecting one of the stored digital values the value as a function of the sensing signal;

digital to analog converter for generating an analog signal corresponding to the one selected digital value;

an impedance matching circuit; and means for applying the analog signal to the impedance matching circuit.

17. The device of claim 16, wherein said analog signal represents a voltage.

* * * * *